United States Patent
Quirant et al.

(10) Patent No.: US 7,201,455 B2
(45) Date of Patent: Apr. 10, 2007

(54) HYDRAULIC BRAKE SYSTEM AND METHOD FOR CONTROLLING SAME

(75) Inventors: Werner Quirant, Beilstein (DE); Guenther Schmidt, Kirchheim A.N. (DE)

(73) Assignee: Robert Bosch, GmbH, Stuttgart (DE)

( * ) Notice: Subject to any disclaimer, the term of this patent is extended or adjusted under 35 U.S.C. 154(b) by 0 days.

(21) Appl. No.: 10/932,678

(22) Filed: Sep. 1, 2004

(65) Prior Publication Data

US 2005/0052077 A1    Mar. 10, 2005

(30) Foreign Application Priority Data

Sep. 5, 2003   (DE)  .............................. 103 40 972

(51) Int. Cl.
*B60T 8/26*        (2006.01)
(52) U.S. Cl. .................................. 303/9.75; 303/113.5
(58) Field of Classification Search ............. 303/114.1, 303/116.1, 116.2, 113.1, 116.3, 10, 186, 116.4, 303/119.1, 113.5, 9.62, 9.73, 9.75, DIG. 1
See application file for complete search history.

(56) References Cited

U.S. PATENT DOCUMENTS

| | | | | |
|---|---|---|---|---|
| 4,702,529 | A * | 10/1987 | Tobiasz | 303/9.62 |
| 5,522,651 | A * | 6/1996 | Sorensen | 303/113.5 |
| 5,538,334 | A * | 7/1996 | Kushi et al. | 303/113.5 |
| 5,741,049 | A * | 4/1998 | Sorensen | 303/9.75 |
| 5,855,417 | A * | 1/1999 | Johnston et al. | 303/3 |
| 6,213,566 | B1 * | 4/2001 | Diaz | 303/9.75 |
| 6,361,126 | B1 * | 3/2002 | Pueschel et al. | 303/114.3 |

FOREIGN PATENT DOCUMENTS

| | | |
|---|---|---|
| DE | 196 48 596 | 5/1998 |
| DE | 199 17 810 | 11/1999 |
| DE | 199 25 794 | 12/2000 |
| WO | WO 00/10853 | 3/2000 |
| WO | WO 02/14130 | 2/2002 |

* cited by examiner

*Primary Examiner*—Christopher P. Schwartz
(74) *Attorney, Agent, or Firm*—Kenyon & Kenyon LLP

(57) ABSTRACT

A road vehicle hydraulic brake system, having a master brake cylinder for generating a master cylinder pressure based on the braking intent of a driver of the vehicle, having a hydraulic unit connected between the master brake cylinder and at least one wheel brake cylinder of at least one wheel, and a method of control thereof are described. The hydraulic unit, with which a brake pressure boost is achievable by generating in the at least one wheel brake cylinder a wheel cylinder pressure greater than the master cylinder pressure, has a system of actuatable valves and at least one hydraulic pump. A differential pressure valve between the master brake cylinder and the hydraulic unit opens or closes the hydraulic connection between the master brake cylinder and the hydraulic unit at a predetermined pressure difference between the master cylinder pressure and the wheel cylinder pressure, to increase the wheel cylinder pressure.

24 Claims, 3 Drawing Sheets

HYDRAULIC BRAKE SYSTEM AND METHOD FOR CONTROLLING SAME

FIELD OF THE INVENTION

The present invention relates to a brake system, in particular for a road vehicle, and to a method for controlling a hydraulic brake system.

BACKGROUND INFORMATION

To ensure maximum braking deceleration of the motor vehicle within the shortest possible time during emergency braking, methods for evaluating an intent of the driver to decelerate and for increasing operating pressure in a brake system are known in which, depending on the rate of pressure buildup in the hydraulic system, an additional pressure boost is provided to allow more rapid pressure buildup, and thus maximum deceleration, to be achieved.

These conventional braking assistance (BA) systems are usually based on a modified brake power booster having additional electrical components, or on a hydraulic unit of a traction control system (TCS) or electronic stability program (ESP) in which the pressure in the master brake cylinder is increased, as needed, by electrical actuation of valves, as a function of a brake pedal travel and/or a change of the pedal travel and/or of the master brake cylinder pressure over time. A certain additional design complexity of the hydraulic system is required to detect these referenced variables and to activate the additional components.

A method for controlling a hydraulic brake power booster for a brake pressure control device is described in German Patent Application No. DE 199 25 794 A1 in which a triggering point is determined at which a hydraulic unit for boosting the brake pressure is activated and/or deactivated, taking into account a derivation over time of a master cylinder pressure and a differential pressure between the pressure in a partial vacuum chamber and/or a working chamber of an automatic brake power booster, and the ambient pressure. This is intended to allow a braking response, even for various braking dynamics (pedal actuation rate), which optimally meets the requirements for pedal comfort, ability to proportion the braking force, and safety.

SUMMARY

For a hydraulic brake system, a differential pressure valve is situated between a master brake cylinder and a hydraulic unit, which for a predetermined pressure difference between the master brake cylinder pressure and wheel brake cylinder pressure opens or closes the hydraulic connection between the master brake cylinder and the hydraulic unit to increase the wheel brake cylinder pressure. In this manner, a braking assistance function without additional hydraulic or electrohydraulic components may be implemented, which at an intended brake pressure is able to provide a rapid increase in a wheel brake cylinder pressure.

A typical hydraulic brake system for a vehicle includes an ABS hydraulic unit having eight solenoid valves, a pressure buildup valve and a pressure reduction valve being associated with each vehicle wheel. A recirculating pump and additional hydraulic and electrical passive components are also provided. The actuation of the braking assistance function is determined by software in the ABS control device. The solenoid valves and the recirculating pump motor present are activated as needed. The pressure in the master brake cylinder is isolated due to the characteristics of the additional components, and the recirculating pump generates a higher pressure in the wheel brake cylinders than in the master brake cylinder. Compared to conventional ABS systems, no electrical cabling and installation are necessary in the hydraulic brake system according to the present invention. Only the novel hydraulic components need be installed and the software in the control device modified.

One preferred embodiment of the present invention provides that the differential pressure valve has at least two valve seats, the first valve seat being closed at a predetermined first pressure difference between the master cylinder pressure and the wheel cylinder pressure, and the second valve seat being opened at a predetermined second pressure difference which is less than the first pressure difference. The present invention relates in particular to a hydraulic slide valve having no electrical parts which is similar in design to a pressure reducing valve. The braking assistance functions may be implemented with minimal complexity by use of this slide valve. The slide valve according to the present invention may be integrated into the ABS hydraulic unit or hydraulically connected to the hydraulic unit, the master brake cylinder, or the lines from the master brake cylinder to the hydraulic unit as an additional built-in or externally mounted element. No change in the component module used heretofore is necessary for the built-in or externally mounted variant, so that the braking assistance system according to the example embodiment is also of interest for compact and midsize vehicles for cost reasons.

The first pressure difference may be, for example, between 30 bar and 70 bar, preferably approximately 50 bar. The second pressure difference may be approximately 1 bar, for example.

BRIEF DESCRIPTION OR THE DRAWINGS

The present invention is explained in greater detail below on the basis of preferred exemplary embodiments, with reference to the associated figures.

DETAILED DESCRIPTION OF EXAMPLE EMOBIDMENTS

Figure 1:
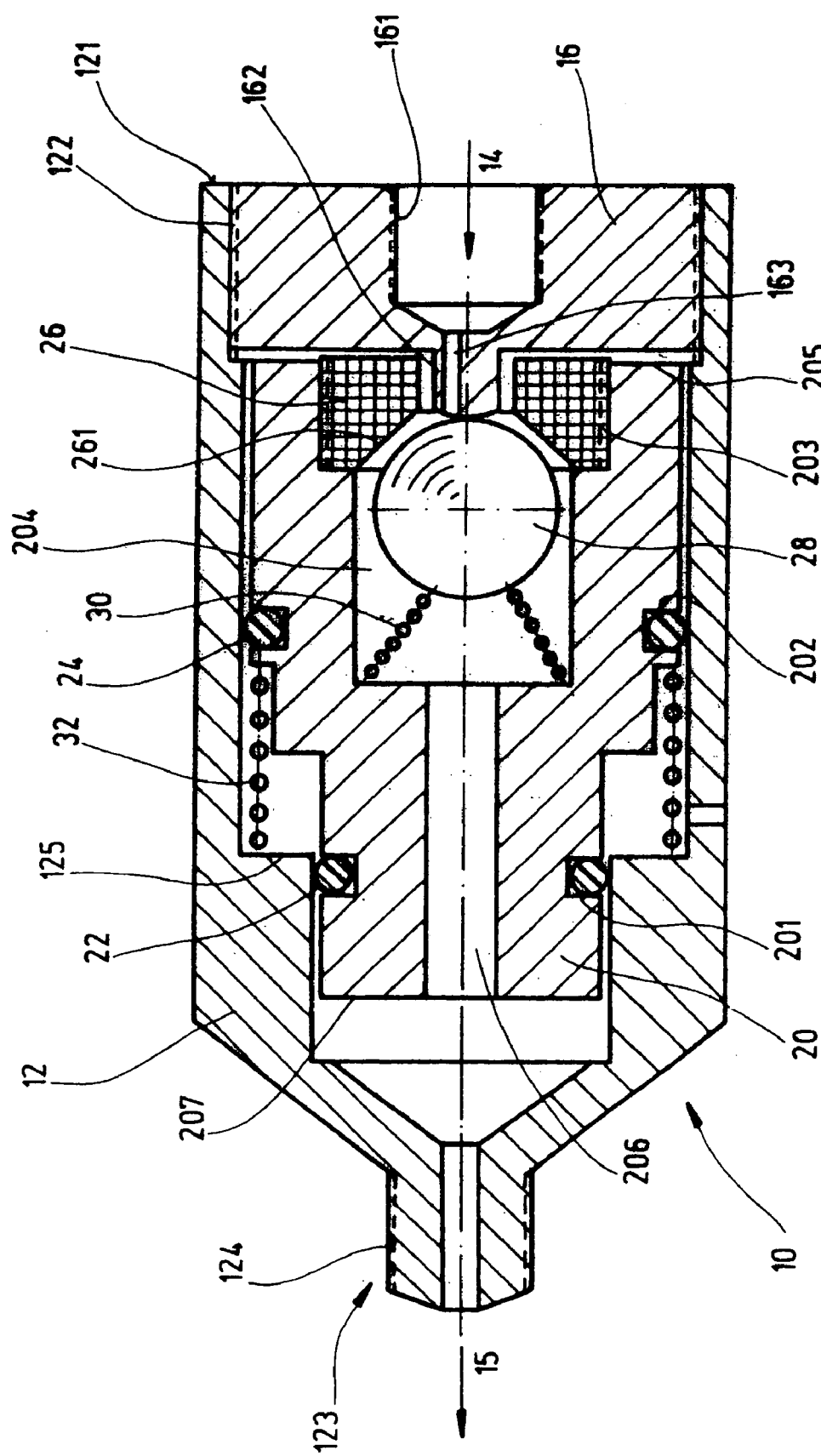
FIG. 1 shows a schematic sectional illustration of a differential pressure valve according to the present invention.

FIG. 1 shows a differential pressure valve 10 according to the present invention in a schematic longitudinal sectional representation. Valve 10 includes a cylindrical housing 12 which on its inner surface area has a stepped section and which on a first end face 121 has a first pressure connection 14 having an internal thread 122. Internal thread 122 is used to screw in a housing cover 16 which has a connecting thread 161 for a brake line from a master brake cylinder (not illustrated). A connecting thread 124 is provided on a second end face 123 of housing 12, opposite from first end face 121, for inserting differential pressure valve 10 into a hydraulic unit or the like. Connecting thread 124 is thus used for connecting to a second pressure connection 15.

A housing insert 20 which is movable in the longitudinal direction within housing 12 has annular grooves 201 and 202 on its outer surface area for accommodating gaskets 22 and 24, respectively, which seal off housing insert 20 with respect to the inner surface area of housing 12, thereby providing for the formation of various pressure chambers in housing 12. Furthermore, on an end face 205 of housing insert 20, facing housing cover 16, an internal thread is provided in which a valve seat 26 may be screwed in, the function of which is explained in greater detail below.

In a receptacle 204 in housing insert 20 which may be closed by insert 26, a spherical valve body 28 is inserted which is supported against housing insert 20 by a spring 30. Housing insert 20 has a central borehole 206 which provides a passage between first pressure connection 14 and second pressure connection 15 when valve seat 261 between valve body 28 and insert 26 is opened.

Housing insert 20 in turn is supported against an end face step 125 in housing 12 by an additional spring 32. In the pressureless and thus relaxed state, housing insert 20 rests with its end face 205 on housing cover 16 due to the elastic force of spring 32. The additional functions of the valve seats are explained in greater detail with reference to FIG. 2.

Figure 2:
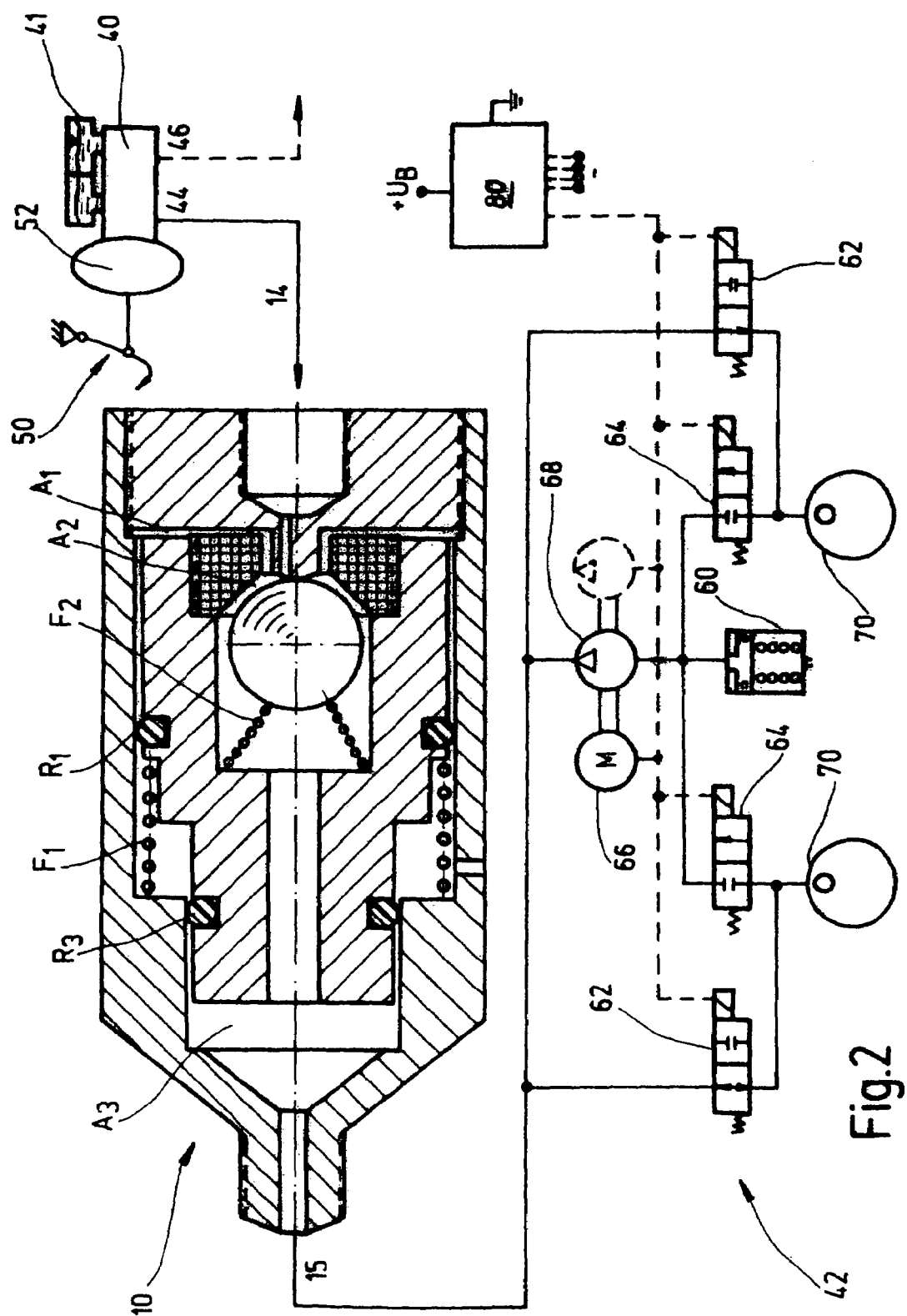
FIG. 2 shows a schematic block diagram of a vehicle brake system.

FIG. 2 shows the layout of differential pressure valve 10 according to the present invention between a master brake cylinder 40 and a hydraulic unit 42, which is composed of various hydraulic and electrohydraulic components. A brake system for a vehicle is indicated which has two separate brake circuits, each of which is supplied with pressure by the master brake cylinder. The brake circuits may be provided, for example, for a diagonal brake circuit distribution or a distribution into a front and a rear brake circuit. The system may basically be used for all ABS brake systems that are based on the recirculation principle.

When pressure is applied to master brake cylinder 40 as the result of brake pedal 50 being actuated by the driver, a pressure buildup occurs, via a brake power booster 52, in first main pressure line 44 and in second main pressure line 46, each of which leads to a differential pressure valve 10 as illustrated in FIG. 2. For the sake of improved clarity, however, only one of the two brake circuits present is illustrated and explained here. The referenced relationships and modes of operation are the same for the second brake circuit.

Phase One

First main pressure line 44 leads to first pressure connection 14 for the differential pressure valve and, depending on its function, provides a pressure increase in hydraulic unit 42, whereby a boost in braking power may be generated in wheel brake cylinders 62, 64 which is greater than that predetermined by the driver via the pedal pressure on brake pedal 50. During a braking intent of the driver the vehicle is usually decelerated as the brake pressure increases. Differential pressure valve 10 initially remains open, so that pressure $p_{circuit}$ in hydraulic unit 42 corresponds to pressure $p_{MC}$ in master brake cylinder 40, ($p_{circuit} = p_{MC}$).

Phase Two

When a predetermined switchover pressure of, for example, 50 bar ($p_{MC}$=50 bar) is reached, housing insert 20 moves against elastic force $F_1$ and friction forces $R_1$ and $R_3$ on gaskets 22 and 24 which slide in the housing, in the direction of the left stop in valve seat 26 in housing 12. Valve spring 30 no longer presses valve body 28 against valve lifter 162 with its elastic force $F_2$, but, rather, presses against valve seat 261 in insert 26 so that slide valve 10 closes. The closing condition for valve 10 is derived from the following inequality:

$$p_{MC} \cdot (A_1 - A_3) > F_1 + R_1 + R_3,$$

where area $A_1$ is associated with the outer diameter of housing insert 20 on its end face 205, and area $A_3$ is associated with the sealing diameter of insert 20 on its oppositely situated end face 207 (see FIG. 2). Value $F_1$ corresponds to the elastic force of valve spring 32. Values $R_1$ and $R_3$ stand for the friction forces on the two sealing rings 22 and 24, respectively, which slide along the inner surface area of valve 10. A typical value for the closing pressure may be approximately 50 bar ($p_{MC\ closing}$=50 bar)

Figure 3:
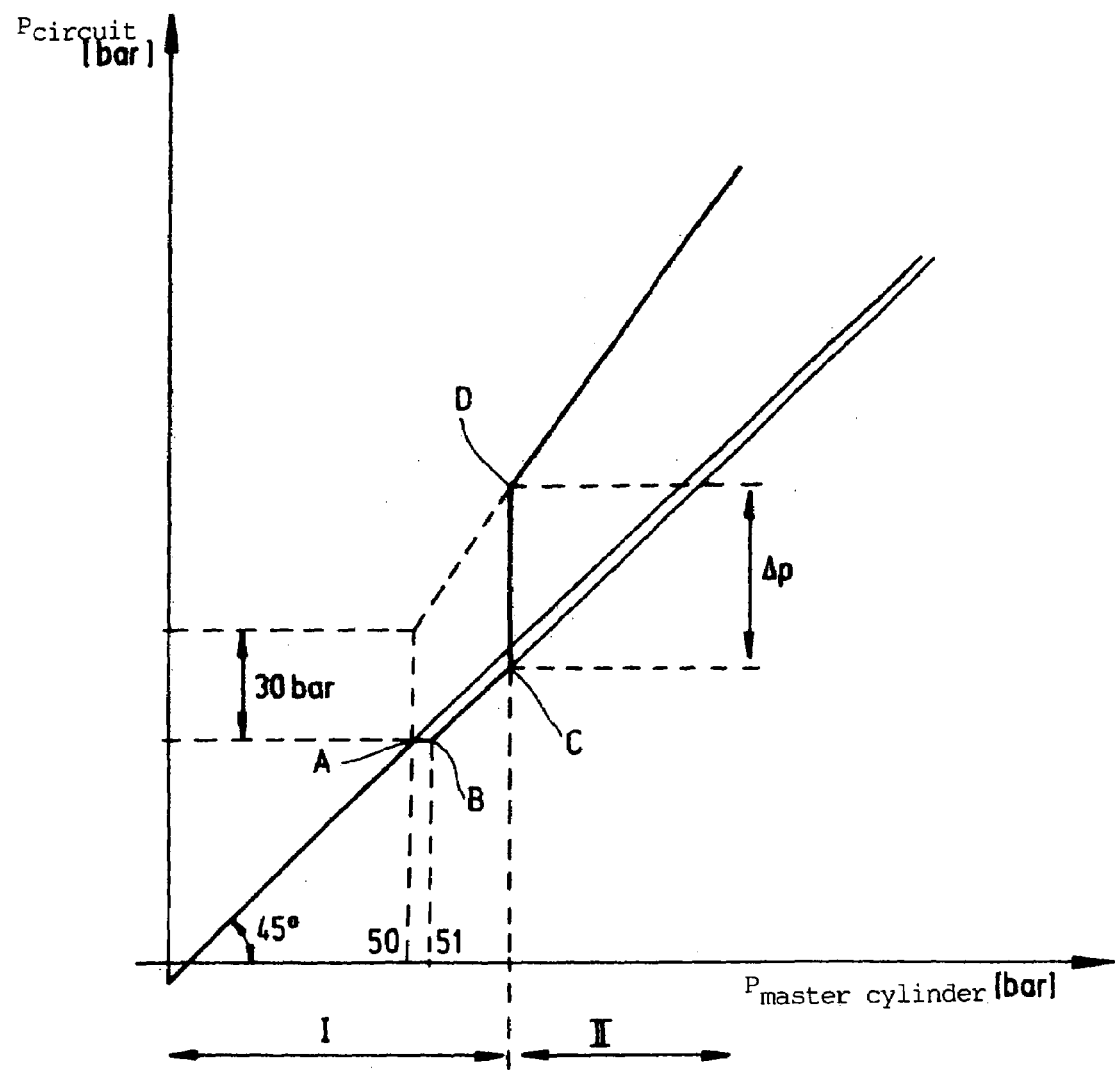
FIG. 3 shows a pressure diagram for illustrating an exemplary design of the differential pressure valve.

In the diagram in FIG. 3, this switchover point A is characterized by the transition of the rising curve to a horizontal curve.

Phase Three

After a slight pressure increase of, for example, 1 bar, slide valve 10 which is designed as a check valve opens, causing pressure $p_{circuit}$ in the brake circuit, which has been reduced by 1 bar with respect to pressure $p_{MC}$ in the master brake cylinder, to further increase. This segment to switchover point B is illustrated by the short horizontal segment of the curve in FIG. 3. The opening pressure is calculated from the following condition:

$$p_{MC} - p_{circuit} > F_2/A_2,$$

where $A_2$ corresponds to the valve seat diameter of valve seat 261 on which valve body 28 rests, as soon as the check valve is closed (see FIG. 2). A typical value for the opening pressure of the check valve may, for example, be approximately 1 bar ($F_2/A_2$=1 bar).

Phase Four

At a point in time which is determined by external influences, for example when vehicle-specific skid or acceleration values for the wheel rotational speed are reached, or by the beginning of a braking action or other variables, a limited quantity of brake fluid is admitted into a low-pressure accumulator chamber 60 in hydraulic unit 42. This may occur, for example, according to the following method. When ABS pressure buildup valves 62 are open, ABS pressure reduction valves 64 are briefly actuated in an asynchronous and pulsed manner so that the pedal reaction and valve noise remain acceptable. This causes accumulator chamber 60 to be filled with a limited quantity of brake fluid. This quantity of brake fluid is withdrawn from master brake cylinder 40, causing brake pedal 50 to yield slightly.

The opening pressure of the valve is calculated from the following inequality:

$$F_1 - R_1 - R_3 + p_{circuit} \cdot A_3 > p_{MC} \cdot (A_1 - A_3),$$

which may be solved for $p_{circuit}$, resulting in the following inequality:

$$p_{circuit} \cdot A_3 > p_{MC} \cdot (A_1 - A_3) - F_1 + R_1 + R_3.$$

Phase Five

After this point C is reached (see FIG. 3), motor 66 of recirculation pump 68 is switched on. The volume of brake fluid present in accumulator chamber 60 is pumped into the brake circuit. On account of closed slide valve 10, initially this volume is not able to flow back to the master brake cylinder circuit. A desired pressure increase in the circuit thus occurs which continues into wheel brake cylinder 70. This corresponds to the typical function of braking assistance.

If the pressure increase in wheel brake cylinders 70 results in unstable conditions for the wheel rotational speed (brake slip), the ABS control is actuated in the customary manner. This regulation is monitored and controlled by a known control unit 80 and is controlled, and has inputs for multiple measured variables, in particular wheel rotational speed, brake pressure, etc.

Phase Six

When the pressure difference $$\Delta p = p_{circuit} - p_{MC}$$

reaches a defined design limiting value, housing insert 20 in slider valve 10 is pressed back against the pressure in the master brake cylinder circuit, causing valve lifter 162 pressing against spherical valve body 28 to open the valve (point D in FIG. 3). After an equilibrium of forces is established at housing insert 20, valve 10 again closes and pressure $p_{circuit}$ in the brake circuit follows a characteristic curve whose slope is increased by a specified value with respect to the characteristic curve of the master brake cylinder circuit. This value is calculated from the area ratios of the valve seats in the differential pressure valve according to the following formula:

$$p_{circuit} = p_{MC} \cdot (A_1 - A_3)/A_3,$$

area $A_1$ being associated with the outer diameter of housing insert 20 at its end face 205, and area $A_3$ being associated with the sealing diameter of insert 20 at its oppositely situated end face 207 (see FIG. 2).

After the braking operation has ended, the driver releases brake pedal 50 and the pressure in the master brake cylinder circuit approaches zero once again. The pressure in hydraulic unit 42 moves insert 20 in slide valve 10 back, causing the valve to open and the pressure in the entire brake system to decrease to zero.

In the diagram in FIG. 3, recirculation pump 68 is switched off in pressure range $p_{MC}=0$–C (region I), and is switched on in pressure range $p_{MC}>C$ (region II).

The small volume of brake fluid in accumulator chamber 60 necessary for proper functioning of the braking assistance may be recovered in the following manner. A test cycle is usually run through after the vehicle start. Upon the first braking, the required pressure in accumulator chamber 60 may be generated by pulsing actuation of ABS pressure reduction valves 64. This is preferably achieved by asynchronous pulsing of valves 64 so that no disturbing noises are generated and no negative pedal reaction occurs at the brake pedal. To eliminate leakage when the valve seats are closed, pressure reduction valves 64 may be cyclically and asynchronously pulsed during brake-free driving for targeted emptying of accumulator chamber 60. In a subsequent braking operation, accumulator chamber 60 may be refilled with a limited quantity of brake fluid via a second pulse cycle.

In a parked or unbraked vehicle, a continuous hydraulic connection from wheel brake cylinders 70 to storage container 41 is provided, thus enabling unhindered volume compensation to take place. This is advantageous, for example for heating or cooling processes in the brake system or for the brake fluid, and/or for compensating for brake lining wear or the movements of the pistons in the wheel brake cylinders.

Upon sudden braking, i.e., a rapid pedal actuation, the ABS valves and the slide valves throttle the pressure buildup in the wheel brake cylinders. This pressure buildup results in closing of the slide valve, and the switched-on recirculation pump increases the pressure in the brake circuit so that the intended function of the braking assistance is generated. If pressure reduction valves 64 are briefly opened during a braking operation, this results in a differential pressure $\Delta p = p_{MC} - p_{circuit}$, causing the slide valve to close and in turn ensuring the function of the braking assistance. Using this method, the braking assistance function may be triggered if needed.

When the antilock brake system (ABS) fails, recirculation pump 68 for hydraulic unit 42 is not actuatable, so that it is also not possible to produce the braking assistance function in the intended manner. When the closing pressure of slide valve 10 is reached, however, the pressure buildup in wheel brake cylinders 70 may be further achieved without boosting, since the flow passes through the valve body in the same manner as for a check valve. When the braking operation has ended, the valve slider returns to the starting position, thereby opening the slide valve. The system thus operates in a safe manner ("fail safe") in the event of an ABS failure.

If the braking assistance function is effective, the slide valve acts as a damper piston which damps the reactions on brake pedal 50 and the noise from recirculation pump 68 and solenoid valves 62 and 64. In this manner comfort requirements are met.

For a brake circuit distribution into a front and a rear brake circuit, the slide valve for the rear brake circuit may be omitted if needed, since for heavy braking the rear axle brakes are able to make only a small contribution to the overall deceleration due to the dynamic axis load distribution toward the front. Otherwise, the risk of overbraking the rear wheels would arise, which would significantly impair the directional stability of the vehicle. In this manner the unboosted pressure for the wheel brake cylinder on the rear axle allows greater lateral traction for the rear wheels. Thus, when the braking assistance function is effective, the vehicle may be braked in a safe and stable manner at all times, which is particularly advantageous for braking maneuvers on a smooth, slippery, or loose surface or roadbed.

What is claimed is:

1. A hydraulic brake system for a road vehicle, comprising:
   a master brake cylinder configured to generate a master cylinder pressure as a function of a braking intent of a driver of the road vehicle;
   a hydraulic unit connected between the master brake cylinder and at least one wheel brake cylinder of at least one wheel, the hydraulic unit having, a system of actuatable valves, an accumulator chamber, and at least one hydraulic pump; and
   a differential pressure valve situated between the master brake cylinder and the hydraulic unit;
   wherein:
      in a first phase, as a function of the master cylinder pressure, a proportional pressure buildup takes place in at least one of the hydraulic unit and the at least one wheel brake cylinder until a switching pressure in the master brake cylinder is reached;
      in a second phase, upon reaching the switching pressure, the differential pressure valve is configured to close to keep constant a pressure in the at least one wheel brake cylinder while the master cylinder pressure increases;

in a third phase, upon reaching a first predetermined pressure difference between the master cylinder pressure and the pressure in the at least one wheel brake cylinder, the differential pressure valve is configured to cause the pressure in the at least one wheel brake cylinder to increase, at least the first predetermined pressure difference remaining during the increase of the pressure in the at least one wheel brake cylinder in the third phase;

in a fourth phase, in response to a further increase in the master cylinder pressure, a limited quantity of brake fluid is introduced from the master brake cylinder into the accumulator chamber as a function of one of reaching of a vehicle-specific slip, reaching of acceleration values of a wheel speed, and a start of a braking operation, the limited quantity of brake fluid being introduced prior to a fifth phase;

in the fifth phase, the at least one hydraulic pump is controlled to use the limited quantity of brake fluid to produce a pressure increase in the at least one of the hydraulic unit and the at least one wheel brake cylinder; and in a sixth phase, upon reaching a predetermined second pressure difference between the master cylinder pressure and the pressure in the at least one wheel brake cylinder, the pressure in the at least one wheel brake cylinder is increased super-proportionally with respect to the master cylinder pressure.

2. The brake system as recited in claim 1, wherein the differential pressure valve has at least two valve seats, a first one of the valve seats being closed at the predetermined second pressure difference between the master cylinder pressure and the pressure in the at least one wheel brake cylinder, and a second one of the valve seats being opened at the predetermined first pressure difference that is less than the second pressure difference.

3. The brake system as recited in claim 2, wherein the first one of the valve seats has a valve slider which is movably situated in a housing for the differential pressure valve.

4. The brake system as recited in claim 2, wherein the second one of the valve seats is designed as a spring-loaded check valve.

5. The brake system as recited in claim 1, wherein the second pressure difference is within a range between 30 bar and 70 bar.

6. The brake system as recited in claim 1, wherein the first pressure difference is approximately one bar.

7. The brake system as recited in claim 1, wherein the differential pressure valve is a slide valve.

8. The brake system as recited in claim 1, wherein the differential pressure valve is closed in response to the super-proportional increase of the wheel brake cylinder pressure.

9. The brake system as recited in claim 1, wherein the second pressure difference is predetermined by the configuration of the differential pressure valve.

10. The brake system as recited in claim 1, wherein the differential pressure valve is configured to be briefly opened after the second pressure difference is reached so that a pressure equalization takes place.

11. The brake system as recited in claim 1, wherein the pressure increase of the fifth phase takes place independently of the master cylinder pressure.

12. The brake system as recited in claim 1, wherein the super-proportional pressure increase is produced by the at least one hydraulic pump.

13. The brake system as recited in claim 1, wherein the limited quantity of brake fluid is introduced by briefly activating pressure-reduction valves at the at least one wheel brake cylinder.

14. A method for controlling a hydraulic brake system for a road vehicle, the hydraulic brake system having a master brake cylinder for generating a master cylinder pressure as a function of the braking intent of a driver of the road vehicle, having a hydraulic unit connected between the master brake cylinder and at least one wheel brake cylinder of at least one wheel, the hydraulic unit having a system of actuatable valves, an accumulator chamber, and at least one hydraulic pump, and having a differential pressure valve between the master brake cylinder and the hydraulic unit, the method comprising:

in a first phase, providing a proportional pressure buildup in at least one of the hydraulic unit and the at least one wheel brake cylinder as a function of the master cylinder pressure;

in a second phase, upon reaching a switching pressure, closing the differential pressure valve to keep constant a pressure in the at least one wheel brake cylinder while the master cylinder pressure increases;

in a third phase, upon reaching a first predetermined pressure difference between the master cylinder pressure and the pressure in the at least one wheel brake cylinder, causing the pressure in the at least one wheel brake cylinder to increase, wherein at least the first predetermined pressure difference remains during the increase of the pressure in the at least one wheel brake cylinder in the third phase;

in a fourth phase, in response to a further increase in the master cylinder pressure, introducing a limited quantity of brake fluid from the master brake cylinder into the accumulator chamber as a function of one of reaching of a vehicle-specific slip, reaching of acceleration values of a wheel speed, a start of a braking operation, and other variables, wherein the limited quantity of brake fluid is introduced prior to a fifth phase;

in the fifth phase, controlling the at least one hydraulic pump to use the limited quantity of brake fluid to produce a pressure increase in the at least one of the hydraulic unit and the at least one wheel brake cylinder;

in a sixth phase, upon reaching a predetermined second pressure difference between the master cylinder pressure and the pressure in the at least one wheel brake cylinder, super-proportionally increasing the pressure in the at least one wheel brake cylinder with respect to the master cylinder pressure.

15. The method as recited in claim 14, wherein, at the predetermined second pressure difference between the master cylinder pressure and the pressure in the at least one wheel brake cylinder, a first valve seat of the differential pressure valve is closed.

16. The method as recited in claim 14, wherein, at the predetermined first pressure difference between the master cylinder pressure and the pressure in the at least one wheel brake cylinder, a second valve seat of the differential pressure valve is opened.

17. The method as recited in claim 14, wherein the second pressure difference is within a range between 30 bar and 70 bar.

18. The method as recited in claim 14, wherein the first pressure difference is approximately one bar.

19. The method as recited in claim 14, wherein the differential pressure valve is closed in response to the super-proportional increase of the wheel brake cylinder pressure.

20. The method as recited in claim 14, wherein the second pressure difference is predetermined by the configuration of the differential pressure valve.

21. The method as recited in claim 14, further comprising:
briefly opening the differential pressure valve after the second pressure difference is reached so that a pressure equalization takes place.

22. The method as recited in claim 14, wherein the pressure increase of the fifth phase takes place independently of the master cylinder pressure.

23. The method as recited in claim 14, wherein the super-proportional pressure increase is produced by the at least one hydraulic pump.

24. The method as recited in claim 14, wherein the introducing of the limited quantity of brake fluid comprises:
briefly activating pressure-reduction valves at the at least one wheel brake cylinder.

* * * * *